(12) United States Patent  (10) Patent No.: US 7,365,751 B2
Shigenaga  (45) Date of Patent: Apr. 29, 2008

(54) TEXTURE PROCESSOR

(75) Inventor: Satoshi Shigenaga, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 422 days.

(21) Appl. No.: 10/983,661

(22) Filed: Nov. 9, 2004

(65) Prior Publication Data

US 2005/0104891 A1 May 19, 2005

(30) Foreign Application Priority Data

Nov. 17, 2003 (JP) ............................. 2003-386769

(51) Int. Cl.
*G06T 11/40* (2006.01)
*G09G 5/00* (2006.01)

(52) U.S. Cl. ...................... 345/552; 345/582; 345/609; 345/566

(58) Field of Classification Search ................ 345/606, 345/608, 609, 531, 532, 534, 535, 552, 582, 345/566
See application file for complete search history.

(56) References Cited

U.S. PATENT DOCUMENTS

| 6,084,601 A | 7/2000 | Thayer | |
| 6,462,747 B1 | 10/2002 | Oh | |
| 6,496,193 B1 * | 12/2002 | Surti et al. | 345/582 |
| 6,993,637 B1 * | 1/2006 | Kwong | 711/167 |
| 7,050,063 B1 * | 5/2006 | Mantor et al. | 345/582 |

FOREIGN PATENT DOCUMENTS

JP  11-154237 A  6/1999

OTHER PUBLICATIONS

Lee, J.H. et al. "The Reduction of the Bandwidth of Texture Memory in Texture Filtering." IEICE Transactions on Information and Systems Inst. Electron. Inf. & Commun Eng Japan, vol. E84-D, No. 9, XP009047377, Sep. 2001, pp. 1275-1276.

* cited by examiner

*Primary Examiner*—Xiao Wu
*Assistant Examiner*—David Lin
(74) *Attorney, Agent, or Firm*—McDermott Will & Emery LLP

(57) ABSTRACT

A memory write section 2 writes texture data in a number capable of being transferred at a time and written in one address, in one of first through fourth texture memories 1a through 1d in common by single write operation. If the V coordinate of texture data to be written is an even number, the texture data is written in the first, second, third and fourth texture memories 1a, 1b, 1c and 1d in this order. If the V coordinate is an odd number, the data is written in the third, fourth, first and second texture memories 1c, 1d, 1a and 1b in this order.

9 Claims, 17 Drawing Sheets

FIG.3

| NUMBER OF BITS OF TEXTURE | WIDTH OF TEXTURE | V IS AN EVEN NUMBER | V IS AN ODD NUMBER |
|---|---|---|---|
| 16bit/pixel | 8 | wcnt[2]=0 | wcnt[2]=1 |
| | 16 | wcnt[3]=0 | wcnt[3]=1 |
| | 32 | wcnt[4]=0 | wcnt[4]=1 |
| | 64 | wcnt[5]=0 | wcnt[5]=1 |
| | 128 | wcnt[6]=0 | wcnt[6]=1 |
| | 256 | wcnt[7]=0 | wcnt[7]=1 |
| | 512 | wcnt[8]=0 | wcnt[8]=1 |
| | 1024 | wcnt[9]=0 | wcnt[9]=1 |
| 32bit/pixel | 8 | wcnt[3]=0 | wcnt[3]=1 |
| | 16 | wcnt[4]=0 | wcnt[4]=1 |
| | 32 | wcnt[5]=0 | wcnt[5]=1 |
| | 64 | wcnt[6]=0 | wcnt[6]=1 |
| | 128 | wcnt[7]=0 | wcnt[7]=1 |
| | 256 | wcnt[8]=0 | wcnt[8]=1 |
| | 512 | wcnt[9]=0 | wcnt[9]=1 |

FIG.4

| WRITE ENABLE | V IS AN EVEN NUMBER | V IS AN ODD NUMBER |
|---|---|---|
| NWEa | nwcnt00 | nwcnt10 |
| NWEb | nwcnt01 | nwcnt11 |
| NWEc | nwcnt10 | nwcnt00 |
| NWEd | nwcnt11 | nwcnt01 |

FIG.7

| NUMBER OF BITS OF TEXTURE | WIDTH OF TEXTURE | MEMORY ADDRESS |
|---|---|---|
| 16bit/pixel | 8 | $V[7:0]$ |
| | 16 | $\{V[6:0], U[3]\}$ |
| | 32 | $\{V[5:0], U[4:3]\}$ |
| | 64 | $\{V[4:0], U[5:3]\}$ |
| | 128 | $\{V[3:0], U[6:3]\}$ |
| | 256 | $\{V[2:0], U[7:3]\}$ |
| | 512 | $\{V[1:0], U[8:3]\}$ |
| | 1024 | $\{V[0], U[9:3]\}$ |
| 32bit/pixel | 8 | $\{V[6:0], U[2]\}$ |
| | 16 | $\{V[5:0], U[3:2]\}$ |
| | 32 | $\{V[4:0], U[4:2]\}$ |
| | 64 | $\{V[3:0], U[5:2]\}$ |
| | 128 | $\{V[2:0], U[6:2]\}$ |
| | 256 | $\{V[1:0], U[7:2]\}$ |
| | 512 | $\{V[0], U[8:2]\}$ |

FIG.8

| NUMBER OF BITS OF TEXTURE | V[0] | U[2:0] | SELa | SELb | SELc | SELd |
|---|---|---|---|---|---|---|
| 16bit/pixel | 0 | 000 | 00 | 00 | 10 | 00 |
| | 0 | 001 | 00 | 01 | 10 | 11 |
| | 0 | 010 | 00 | 00 | 00 | 10 |
| | 0 | 011 | 11 | 00 | 01 | 10 |
| | 0 | 100 | 10 | 00 | 00 | 00 |
| | 0 | 101 | 10 | 11 | 00 | 01 |
| | 0 | 110 | 00 | 10 | 00 | 00 |
| | 0 | 111 | 01 | 10 | 11 | 00 |
| | 1 | 000 | 10 | 00 | 00 | 00 |
| | 1 | 001 | 10 | 11 | 00 | 01 |
| | 1 | 010 | 00 | 10 | 00 | 00 |
| | 1 | 011 | 01 | 10 | 11 | 00 |
| | 1 | 100 | 00 | 00 | 10 | 00 |
| | 1 | 101 | 00 | 01 | 10 | 11 |
| | 1 | 110 | 00 | 00 | 00 | 10 |
| | 1 | 111 | 11 | 00 | 01 | 10 |
| 32bit/pixel | 0 | x00 | 00 | 01 | 10 | 11 |
| | 0 | x01 | 11 | 00 | 01 | 10 |
| | 0 | x10 | 10 | 11 | 00 | 01 |
| | 0 | x11 | 01 | 10 | 11 | 00 |
| | 1 | x00 | 10 | 11 | 00 | 01 |
| | 1 | x01 | 01 | 10 | 11 | 00 |
| | 1 | x10 | 00 | 01 | 10 | 11 |
| | 1 | x11 | 11 | 00 | 01 | 10 |

FIG.9

| NUMBER OF BITS OF TEXTURE | V[0] | U[2:0] | NCEa | NCEb | NCEc | NCEd |
|---|---|---|---|---|---|---|
| 16bit/pixel | 0 | 000 | 0 | 1 | 0 | 1 |
| | 0 | 001 | 0 | 0 | 0 | 0 |
| | 0 | 010 | 1 | 0 | 1 | 0 |
| | 0 | 011 | 0 | 0 | 0 | 0 |
| | 0 | 100 | 0 | 1 | 0 | 1 |
| | 0 | 101 | 0 | 0 | 0 | 0 |
| | 0 | 110 | 1 | 0 | 1 | 0 |
| | 0 | 111 | 0 | 0 | 0 | 0 |
| | 1 | 000 | 0 | 1 | 0 | 1 |
| | 1 | 001 | 0 | 0 | 0 | 0 |
| | 1 | 010 | 1 | 0 | 1 | 0 |
| | 1 | 011 | 0 | 0 | 0 | 0 |
| | 1 | 100 | 0 | 1 | 0 | 1 |
| | 1 | 101 | 0 | 0 | 0 | 0 |
| | 1 | 110 | 1 | 0 | 1 | 0 |
| | 1 | 111 | 0 | 0 | 0 | 0 |
| 32bit/pixel | x | xxx | 0 | 0 | 0 | 0 |

FIG.10

| NUMBER OF BITS OF TEXTURE | V[0] | U[2:0] | T0 | T1 | T2 | T3 |
|---|---|---|---|---|---|---|
| 16bit/pixel | 0 | 000 | DOa[31:16] | DOa[15:0] | DOc[31:16] | DOc[15:0] |
| | 0 | 001 | DOb[15:0] | DOb[31:16] | DOc[15:0] | DOd[31:16] |
| | 0 | 010 | DOb[31:16] | DOb[15:0] | DOd[31:16] | DOd[15:0] |
| | 0 | 011 | DOb[15:0] | DOc[31:16] | DOd[15:0] | DOa[31:16] |
| | 0 | 100 | DOc[31:16] | DOc[15:0] | DOa[31:16] | DOa[15:0] |
| | 0 | 101 | DOc[15:0] | DOd[31:16] | DOa[15:0] | DOb[31:16] |
| | 0 | 110 | DOd[31:16] | DOd[15:0] | DOb[31:16] | DOb[15:0] |
| | 0 | 111 | DOd[15:0] | DOa[31:16] | DOb[15:0] | DOa[15:0] |
| | 1 | 000 | DOc[31:16] | DOc[15:0] | DOa[31:16] | DOa[15:0] |
| | 1 | 001 | DOc[15:0] | DOd[31:16] | DOa[15:0] | DOb[31:16] |
| | 1 | 010 | DOd[31:16] | DOd[15:0] | DOb[31:16] | DOb[15:0] |
| | 1 | 011 | DOd[15:0] | DOa[31:16] | DOb[15:0] | DOc[31:16] |
| | 1 | 100 | DOa[31:16] | DOa[15:0] | DOc[31:16] | DOc[15:0] |
| | 1 | 101 | DOa[15:0] | DOb[31:16] | DOc[15:0] | DOd[31:16] |
| | 1 | 110 | DOb[31:16] | DOb[15:0] | DOd[31:16] | DOd[15:0] |
| | 1 | 111 | DOb[15:0] | DOc[31:16] | DOd[15:0] | DOa[31:16] |
| 32bit/pixel | 0 | x00 | DOa[31:0] | DOb[31:0] | DOc[31:0] | DOd[31:0] |
| | 0 | x01 | DOb[31:0] | DOc[31:0] | DOd[31:0] | DOa[31:0] |
| | 0 | x10 | DOc[31:0] | DOd[31:0] | DOa[31:0] | DOb[31:0] |
| | 0 | x11 | DOd[31:0] | DOa[31:0] | DOb[31:0] | DOc[31:0] |
| | 1 | x00 | DOc[31:0] | DOd[31:0] | DOa[31:0] | DOb[31:0] |
| | 1 | x01 | DOd[31:0] | DOa[31:0] | DOb[31:0] | DOc[31:0] |
| | 1 | x10 | DOa[31:0] | DOb[31:0] | DOc[31:0] | DOd[31:0] |
| | 1 | x11 | DOb[31:0] | DOc[31:0] | DOd[31:0] | DOa[31:0] |

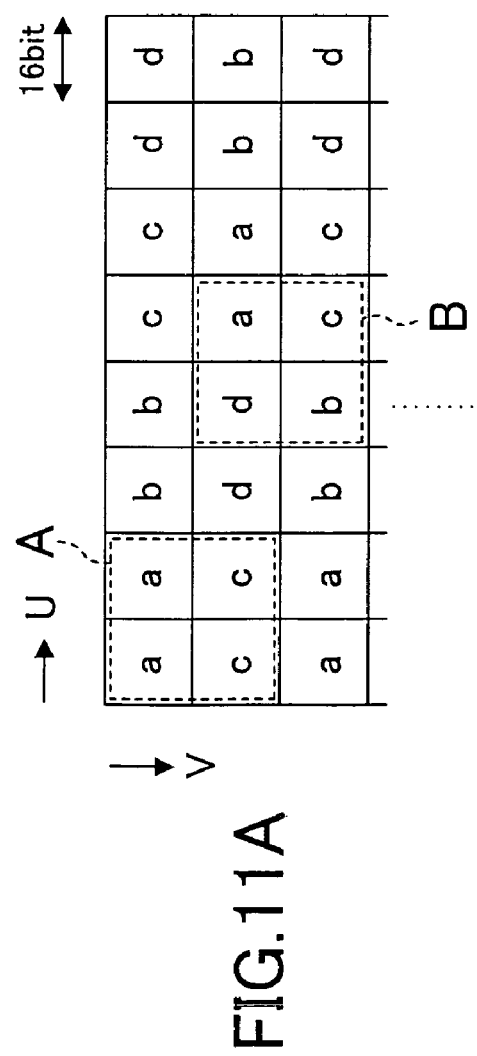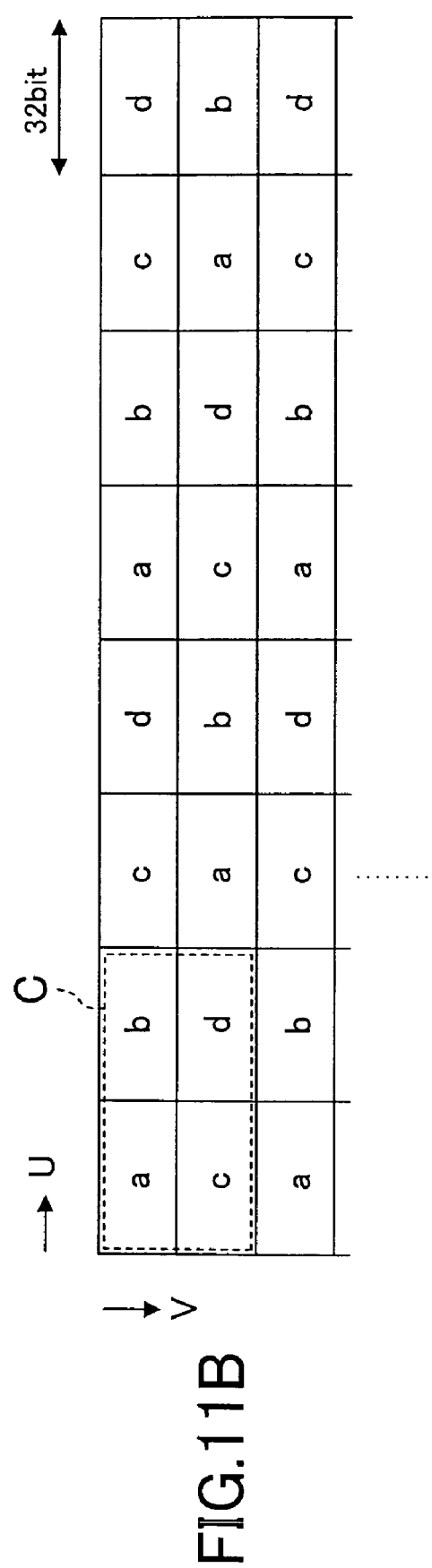
FIG.11A
FIG.11B

FIG.13

| NUMBER OF BITS OF TEXTURE | WIDTH OF TEXTURE | V IS AN EVEN NUMBER | V IS AN ODD NUMBER |
|---|---|---|---|
| 16bit/pixel | 8 | wcnt[2]=1 | wcnt[2]=0 |
| | 16 | wcnt[3]=1 | wcnt[3]=0 |
| | 32 | wcnt[4]=1 | wcnt[4]=0 |
| | 64 | wcnt[5]=1 | wcnt[5]=0 |
| | 128 | wcnt[6]=1 | wcnt[6]=0 |
| | 256 | wcnt[7]=1 | wcnt[7]=0 |
| | 512 | wcnt[8]=1 | wcnt[8]=0 |
| | 1024 | wcnt[9]=1 | wcnt[9]=0 |
| 32bit/pixel | 8 | wcnt[3]=1 | wcnt[3]=0 |
| | 16 | wcnt[4]=1 | wcnt[4]=0 |
| | 32 | wcnt[5]=1 | wcnt[5]=0 |
| | 64 | wcnt[6]=1 | wcnt[6]=0 |
| | 128 | wcnt[7]=1 | wcnt[7]=0 |
| | 256 | wcnt[8]=1 | wcnt[8]=0 |
| | 512 | wcnt[9]=1 | wcnt[9]=0 |

| |
|---|
| Va=0 |
| Va=1 |
| Va=2 |
| Va=3 |
| Va=4 |
| Va=5 |
| Va=6 |
| Va=7 |

| |
|---|
| Vb=1 |
| Vb=2 |
| Vb=3 |
| Vb=4 |
| Vb=5 |
| Vb=6 |
| Vb=7 |
| Vb=0 (Va=7) |

| | |
|---|---|
| Vc=2 | ·····> V'=0 |
| Vc=3 | ·····> V'=1 |
| Vc=4 | ·····> V'=2 |
| Vc=5 | ·····> V'=3 |
| Vc=6 | ·····> V'=4 |
| Vc=7 | ·····> V'=5 |
| Vc=0 (Vb=7) | ·····> V'=6 |
| Vc=1 | ·····> V'=7 |

TEXTURE PROCESSOR

CROSS-REFERENCE TO RELATED APPLICATION

This application is related to Japanese Patent Application No. 2003-386769 filed on Nov. 17, 2003, whose priority is claimed under 35 USC §119, the disclosure of which is incorporated by reference in its entirety.

BACKGROUND OF THE INVENTION

The present invention relates to texture processors for performing bilinear filtering used in the field of computer graphics and other fields.

In recent years, many game machines and car navigation systems use texture mapping with which patterns are mapped to objects so as to obtain realistic images. In the texture mapping, texture coordinates (U, V) corresponding to the (X, Y) coordinates of each pixel constituting an object are calculated so that texture data is taken out and rendered from a texture on a two-dimensional grid based on the texture coordinates (U, V).

The texture coordinates (U, V) have decimal fractions, and thus the coordinates do not always coincide with coordinates on the two-dimensional grid of the texture. Examples of methods for taking texture data include: point sampling in which the texture coordinates (U, V) are rounded to integers and texture data on a two-dimensional grid is taken out; and bilinear filtering in which the average of texture data at four neighboring points is calculated using decimal fractions of the texture coordinates (U, V). Bilinear filtering allows interpolation of texture data even if the texture coordinates (U, V) cannot be rounded to integers. Accordingly, even in the case of altering the shape of objects or rotating the objects, the bilinear filtering generally provides higher image quality than the point sampling.

FIG. 19 shows a concept of bilinear filtering. In FIG. 19, T is the position indicated by texture coordinates (U, V), p is the decimal fraction of U, q is the decimal fraction of V, $0 \leq p < 1$ and $0 \leq q < 1$. T0, T1, T2 and T3 are texture data at respective four closest points to T on a two-dimensional grid. Suppose the integer fractions of T are (u, v), the coordinates of T0 are (u, v), the coordinates of T1 are (u+1, v), the coordinates of T2 are (u, v+1) and the coordinates of T3 are (u+1, v+1).

Bilinear filtering uses the following equation:

$$T=(1-p)\times(1-q)\times T0+p\times(1-q)\times T1+(1-p)\times q\times T2+p\times q\times T3$$

The RGB values of T0, T1, T2 and T3 are calculated using this equation.

As described above, bilinear filtering requires texture data at four points in order to create one texture. To perform texture mapping with LSI, a texture is once stored in an internal memory and then is referred to. In the case of bilinear filtering, it is necessary to refer to the internal memory four times in order to create one texture. Therefore, processing speed is low.

To perform bilinear filtering at high speed, proposed is a technique in which a texture is divided into data sets having coordinates (2m, 2n), (2m+1, 2n), (2m, 2n+1) and (2m+1, 2n+1), respectively, (where m and n are integers) on a two-dimensional grid and the divided texture data sets are stored in respective four memories so that these texture data sets are read out from the four memories at the same time during bilinear filtering (e.g., Japanese Unexamined Patent Publication (Kokai) No. 11-154237.)

SUMMARY OF THE INVENTION

In the foregoing conventional technique, it is necessary to divide texture data into four data sets so that these divided data sets are respectively stored in the associated memories. Therefore, in a case where plural pixels of texture data can be transferred to memories via a data bus at the same time, for example, there arises the problem that the transfer is not performed at the maximum speed.

For example, if a texture mapping device processes 16 bits (/pixel) of texture data and 32 bits (/pixel) of texture data, the number of bits constituting data stored in each address in an internal memory is 32 in general. If a data bus for transferring texture data to the internal memory is for 32 bits, two pixels of 16-bit texture data are transferred at a time. However, in the conventional technique, these two pixels of texture data need to be stored in different memories. Therefore, read/modify/write processing is also included in the memories. As a result, the texture data cannot be transferred at the maximum speed and the transfer speed of the data bus is low.

In addition, since texture data is always read out from four memories during bilinear filtering in the conventional technique, there arises another problem of high power consumption in a memory section.

It is therefore an object of the present invention to enable high-speed transfer of texture data to texture memories so that bilinear filtering is performed at high speed in a texture processor for performing bilinear filtering.

To solve the problems described above, according to the present invention, a texture processor includes: first, second, third and fourth texture memories for storing texture data; a memory write section for controlling writing of supplied texture data in the first through fourth texture memories; a memory read section for controlling reading of texture data at four points close to texture coordinates from the first through fourth texture memories; and a bilinear filtering calculating section for performing bilinear filtering calculation using the texture data at four point read out from the first through fourth texture memories by the memory read section. In this texture processor, in single write operation, the memory write section writes texture data in a number capable of being transferred at a time and written in one address, in one of the first through fourth texture memories in common, and if V coordinate of texture data to be written is an even number, the texture data is written in the first, second, third and fourth texture memories in this order whereas if the V coordinate is an odd number, the texture data is written in the third, fourth, first and second texture memories in this order.

In this processor, texture data in a number capable of being transferred at a time and written in one address are written in one of the first through fourth texture memories. Accordingly, unnecessary processing during transfer of texture data is eliminated and data is written at a speed achieved by taking advantage of the transfer ability of a data bus. In addition, data is written in the first, second, third and fourth texture memories in this order if V coordinate of texture data is an even number whereas data is written in the third, fourth, first and second texture memories in this order if the V coordinate is an odd number. Accordingly, texture data sets whose U coordinates are the same but whose V coordinates differ from each other by "1" are always stored in different texture memories. This allows necessary texture data at four points to be read out at a time during bilinear filtering.

In the texture processor, in reading data, the memory read section may disable a chip enable with respect to at least one of the first through fourth texture memories to which access is unnecessary. Alternatively, the memory read section may stop the input of a clock to at least one of the first through fourth texture memories to which access is unnecessary. Then, power consumption of the texture processor is reduced.

In the texture processor, the memory write section preferably receives a V line mode indicating whether a head V coordinate of supplied texture data is an even number or an odd number, and determines the V coordinate of the texture data is an even number or an odd number in accordance with the V line mode.

In the texture processor, the memory write section may be configured such that a start address for data writing is settable. Alternatively, the memory write section may shift supplied texture data by a specified shift value and writes the shifted texture data in the first through fourth texture memories.

The texture processor according to the present invention preferably further includes: a memory data movement controlling section for moving texture data with maximum V coordinate of a first texture data set to a position where texture data with minimum V coordinate of a second texture data set is stored in the first through fourth texture memories, when the second texture data set is written in the first through fourth texture memories in which the first texture data set is stored, the second texture data set being to be used next to the first texture data set.

In the texture processor, the memory write section preferably writes texture data except for texture data with minimum V coordinate of a second texture data set at a following position of texture data with maximum V coordinate of a first texture data set, when the second texture data is written in the first through fourth texture memories in which the first texture data set is stored, the second texture data set being to be used next to the first texture data set, and the memory read section reads the texture data of the second texture data set with reference to a position where the texture data with the maximum V coordinate of the first texture data set is stored.

In the texture processor, it is preferable that two texture data are transferred if texture data is composed of 16 bits per pixel and one texture data is transferred if texture data is composed of 32 bits per pixel.

According to the present invention, in a case where plural pixels of texture data are transferred via a data bus at a time, the texture data is written in texture memories at a speed obtained by taking advantage of the transfer ability of the data bus. During bilinear filtering, four necessary texture data is read out from the texture memories at a time. As a result, the texture data is transferred at high speed and bilinear filtering is also performed at high speed.

BRIEF DESCRIPTION OF THE DRAWINGS

FIG. 3 is a table for explaining operation of the memory write section shown in FIG. 2, and shows requirements for determining whether the V coordinate of texture data to be written in a memory is an even number of an odd number.

FIG. 4 is a table for explaining operation of the memory write section shown in FIG. 2, and shows requirements for determining write enables.

FIG. 7 is a table for explaining operation of a memory read section shown in FIG. 1, and shows memory addresses generated by a T0 address generator.

FIG. 8 is a table for explaining operation of the memory read section shown in FIG. 1, and shows select signals.

FIG. 9 is a table for explaining operation of the memory read section shown in FIG. 1, and shows chip enables.

FIG. 10 is a table for explaining operation of a texture selector, and shows texture data T0 through T3.

FIGS. 11A and 11B are tables showing a concept of write and read operation of texture data in the first embodiment.

FIG. 13 is a table for explaining operation of the memory write section shown in FIG. 12, and shows requirements for determining whether the V coordinate of texture data to be written in a memory is an even number or an odd number in a case where the V coordinate of a texture data set starts with an odd number.

DESCRIPTION OF THE PREFERRED EMBODIMENTS

Hereinafter, embodiments of the present invention will be described with reference to drawings.

Embodiment 1

Figure 1:
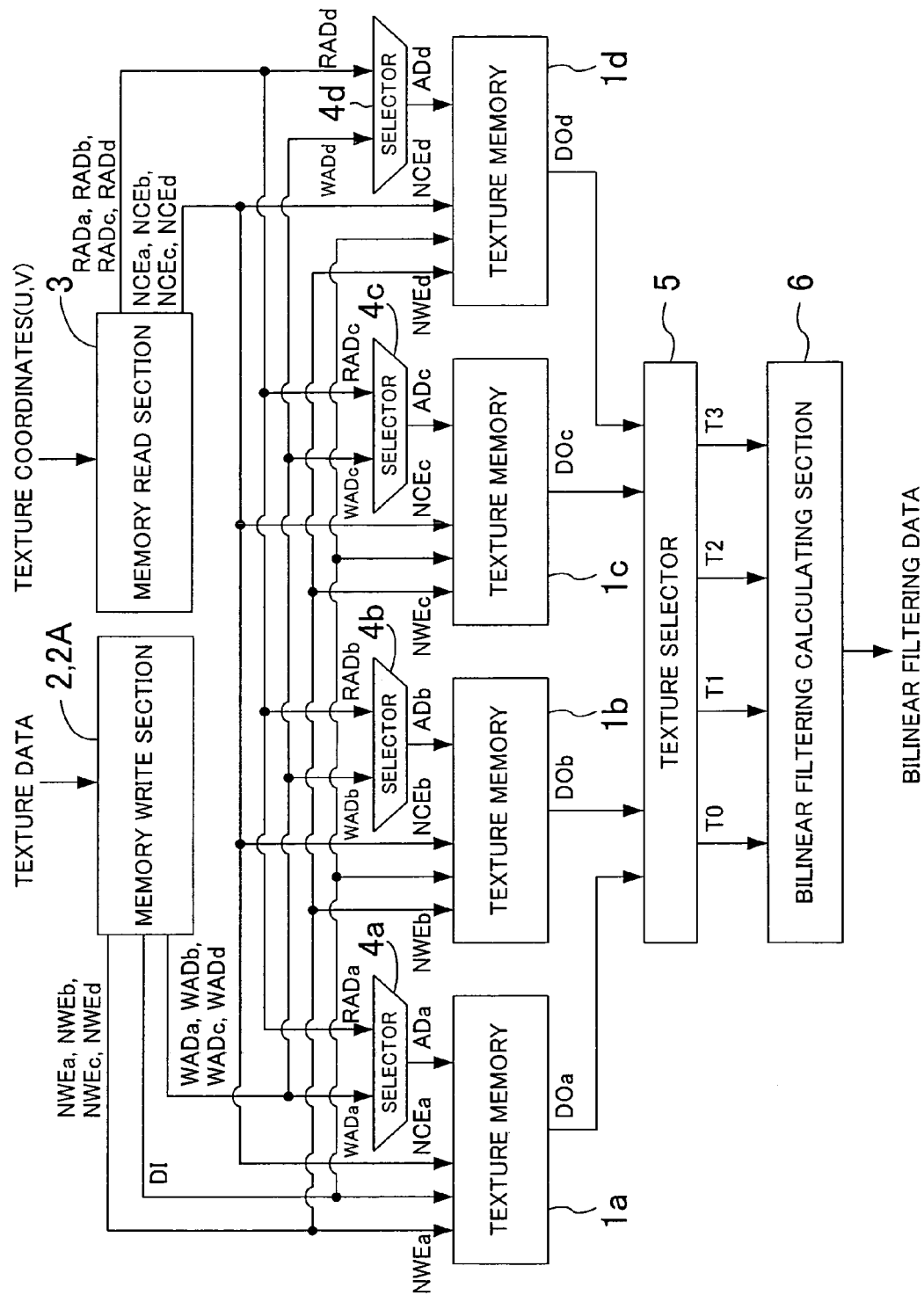
FIG. 1 is a block diagram showing configurations of texture processors according to first and second embodiments of the present invention.

FIG. 1 is a block diagram showing a configuration of a texture processor according to a first embodiment of the present invention. In FIG. 1, first, second, third and fourth texture memories 1a, 1b, 1c and 1d are memories for storing texture data. In this embodiment, each of the memories is constituted by 32 bits×256 words. The texture processor is configured to allow 32 bits of data to be transferred at a time. The texture memories 1a through 1d receive write enables, addresses or data at rising edges of clocks.

A memory write section 2 controls writing of texture data loaded from an external storage means or the like in the texture memories 1a through 1d and outputs write data DI, write addresses WADa, WADb, WADc and WADd and write enables NWEa, NWEb, NWEc and NWEd. In this embodiment, each of the supplied texture data and the write data DI is composed of 32 bits and each of the write addresses WADa through WADd is composed of 8 bits. With respect to the write enables NWEa through NWEd, "0" denotes a write state and "1" denotes a read state.

A memory read section 3 controls reading of texture data necessary for bilinear filtering from the texture memories 1a through 1d based on supplied texture coordinates (already rounded to integers), and outputs read addresses RADa, RADb, RADc and RADd and chip enables NCEa, NCEb, NCEc and NCEd. In this embodiment, each of the read addresses RADa through RADd is composed of 8 bits. With respect to the chip enables NCEa through NCEd, "0" denotes making the memories 1a through 1d into operation and "1" denotes suspending the memories 1a through 1d. When the memories 1a through 1d are suspended, power consumption is reduced.

Selectors 4a, 4b, 4c and 4d are provided associated with the respective texture memories 1a through 1d. In a period during which texture data is written in the texture memories 1a through 1d, the selectors 4a through 4d select the write addresses WADa through WADd output from the memory write section 2. In a bilinear filtering calculation period, the selectors 4a through 4d select the read addresses RADa through RADd output from the memory read section 3 and output the selected addresses RADa through RADd as memory addresses ADa, ADb, ADc and ADc, respectively.

Figures 18A, 18B, 18C, 19:
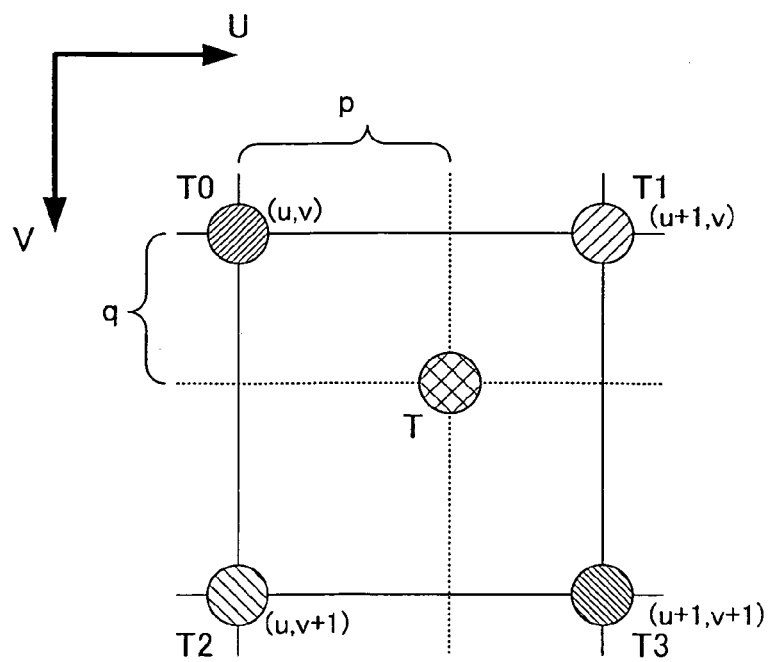
FIGS. 18A through 18C show a state in which divided texture data sets are stored in a texture memory in order.
FIG. 19 shows a concept of bilinear filtering.

A texture selector 5 selects and outputs texture data T0 through T3 at four points necessary for bilinear filtering calculation as shown in FIG. 19 from data D0a, D0b, D0c and D0d read out from the texture memories 1a through 1d. A bilinear filtering calculating section 6 performs bilinear filtering calculation using the selected texture data T0 through T3 at four points output from the texture selector 5, and outputs bilinear filtering data. This bilinear filtering data is written in an area corresponding to rendering coordinates (X, Y) of a frame memory, which is not shown. Object data in the frame memory is displayed with a displaying device such as a display monitor.

Hereinafter, a configuration and operation of the memory write section 2 will be described specifically.

Figure 2:
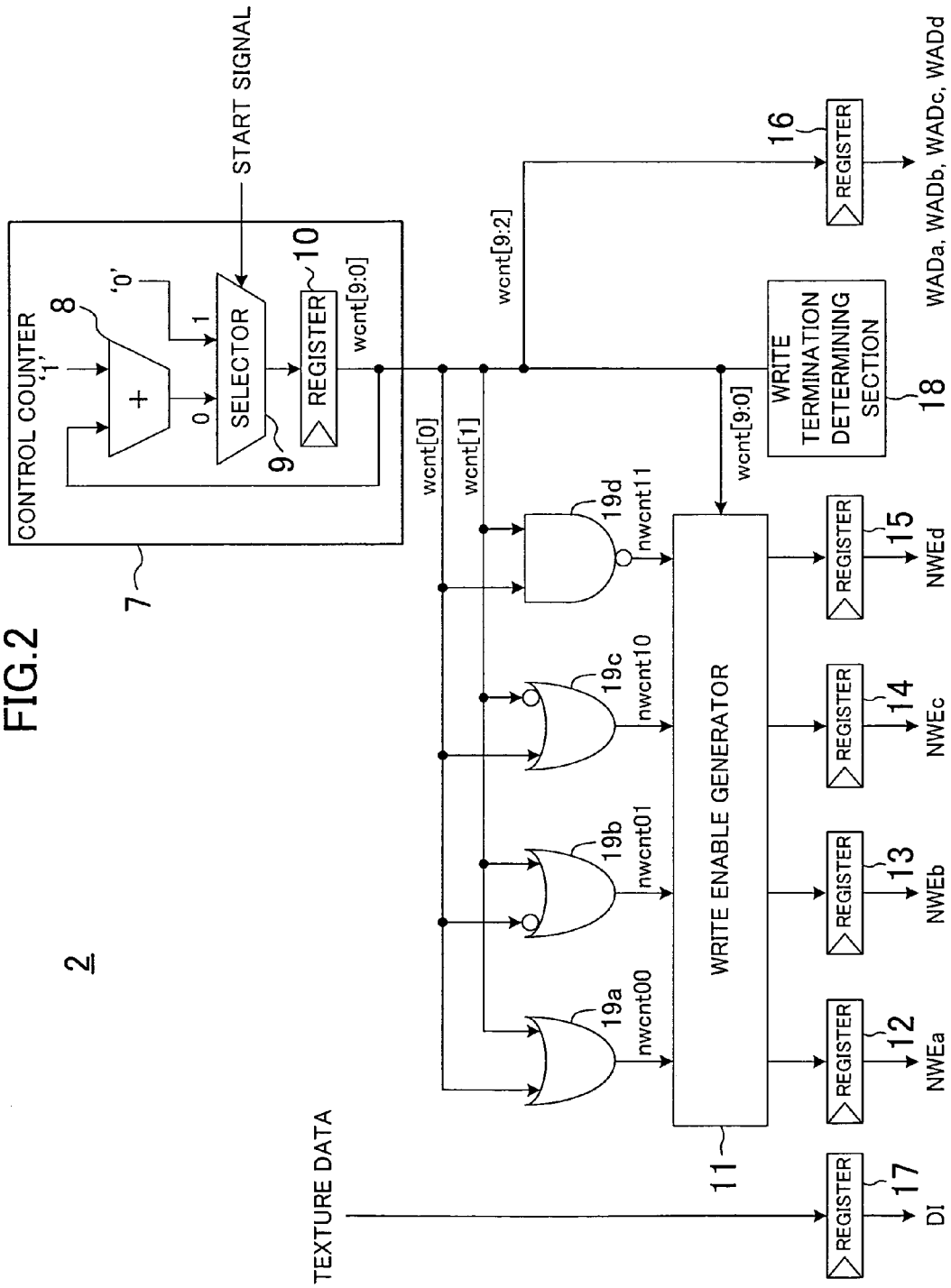
FIG. 2 is a diagram showing an internal configuration of a memory write section shown in FIG. 1.

FIG. 2 is a diagram showing an internal configuration of the memory write section 2 shown in FIG. 1. In FIG. 2, a control counter 7 generates a write count value wcnt and is constituted by an adder 8, a selector 9 and a register 10. The adder 8 adds "1" to the value of the register 10. The selector 9 selects a result of the adder 8 when a start signal is "0" and selects "0" when the start signal is "1". The register 10 is a 10-bit flip-flop for storing the output from the selector 9. The value of the register 10 serves as the write count value wcnt.

In this embodiment, "[ ]" after the name of data, e.g., "wcnt [9:0]", indicates the bit position of the data. Specifically, [i:j] represents successive (i−j+1) bits from the $i^{-th}$ bit to the $j^{-th}$ bit. For example, wcnt [9:0] represents successive 10 bits from the ninth bit to the 0th bit of data wcnt. Likewise, [i] represents one bit of the $i^{-th}$ bit of the data. For example, wcnt [0] represents the 0th bit of data wcnt and wcnt [1] represents the first bit of the data wcnt.

A logic circuit 19a obtains the logical sum of wcnt [0] and wcnt [1] and outputs the obtained logical sum as data nwcnt00. The data nwcnt00 is "0" only when wcnt [1:0]=00 (binary number). Likewise, a logic circuit 19b obtains the logical sum of the logical NOT of wcnt [0] and wcnt [1] and outputs the obtained logical sum as data nwcnt01. The data nwcnt01 is "0" only when wcnt [1:0]=01 (binary number). A logic circuit 19c obtains the logical sum of wcnt [0] and the logical NOT of wcnt [1] and outputs the obtained logical sum as data nwcnt10. The data nwcnt10 is "0" only when wcnt [1:0]=10 (binary number). A logic circuit 19d obtains the logical NOT of the logical AND of wcnt [0] and wcnt [1] and outputs the obtained logical NOT as data nwcnt11. The data nwcnt11 is "0" only when wcnt [1:0]=11 (binary number).

A write enable generator 11 selects one of the data nwcnt00, nwcnt01, nwcnt10 and nwcnt11 as the write enable NWEa, NWEb, NWEc or NWEd, respectively, based on the number of bits (per pixel) and the width of texture data and the write count value wcnt [9:0]. FIGS. 3 and 4 show examples of requirements for selecting the write enables NWEa through NWEd. The write enables NWEa through NWEd output from the write enable generator 11 are stored in respective registers 12 through 15 and determined.

The write enables NWEa through NWEd are generated such that writing is performed in the order of texture memories 1a→1b→1c→1d→1a . . . when the V coordinate of texture data to be written is an even number and writing is performed in the order of 1c→1d→1a→1b→1c . . . when the V coordinate is an odd number.

That is, it is determined whether the V coordinate of texture data to be written is an even number or an odd number based on requirements as shown in FIG. 3. For example, if the number of bits of a texture is 16 (bit/pixel) and the width is 8 (pixel), 32 bits of data can be transferred. Accordingly, two pixels of texture data are written by performing memory write operation once. To store eight pixels of texture data in a memory, write operation needs to be performed four times. Specifically, the V coordinate is switched between an even number and an odd number every time write operation, which is performed four times in total, is performed, so that the V coordinate is an even number when wcnt [2]=0 and the V coordinate is an odd number when wcnt [2]=1.

Then, as shown in FIG. 4, the write enables NWEa through NWEd are switched depending on whether the V coordinate is an even number or an odd number.

A register 16 is an 8-bit flip-flop and stores wcnt [9:2], i.e., the eight most-significant bits of the write count value. The value of the register 16 serves as data shared by the write addresses WADa through WADd. The write addresses WADa through WADd use the value of wcnt [9:2] and thus are incremented by "1" every time memory write operation, which is performed four times in total, is performed. A register 17 is a 32-bit flip-flop and stores supplied texture data. The value of the register 17 is output as write data DI. A write termination determining section 18 monitors the write count value wcnt [9:0] and when the number of memory write operations reaches a given number necessary for processing, the memory write operation is terminated.

Figure 5:
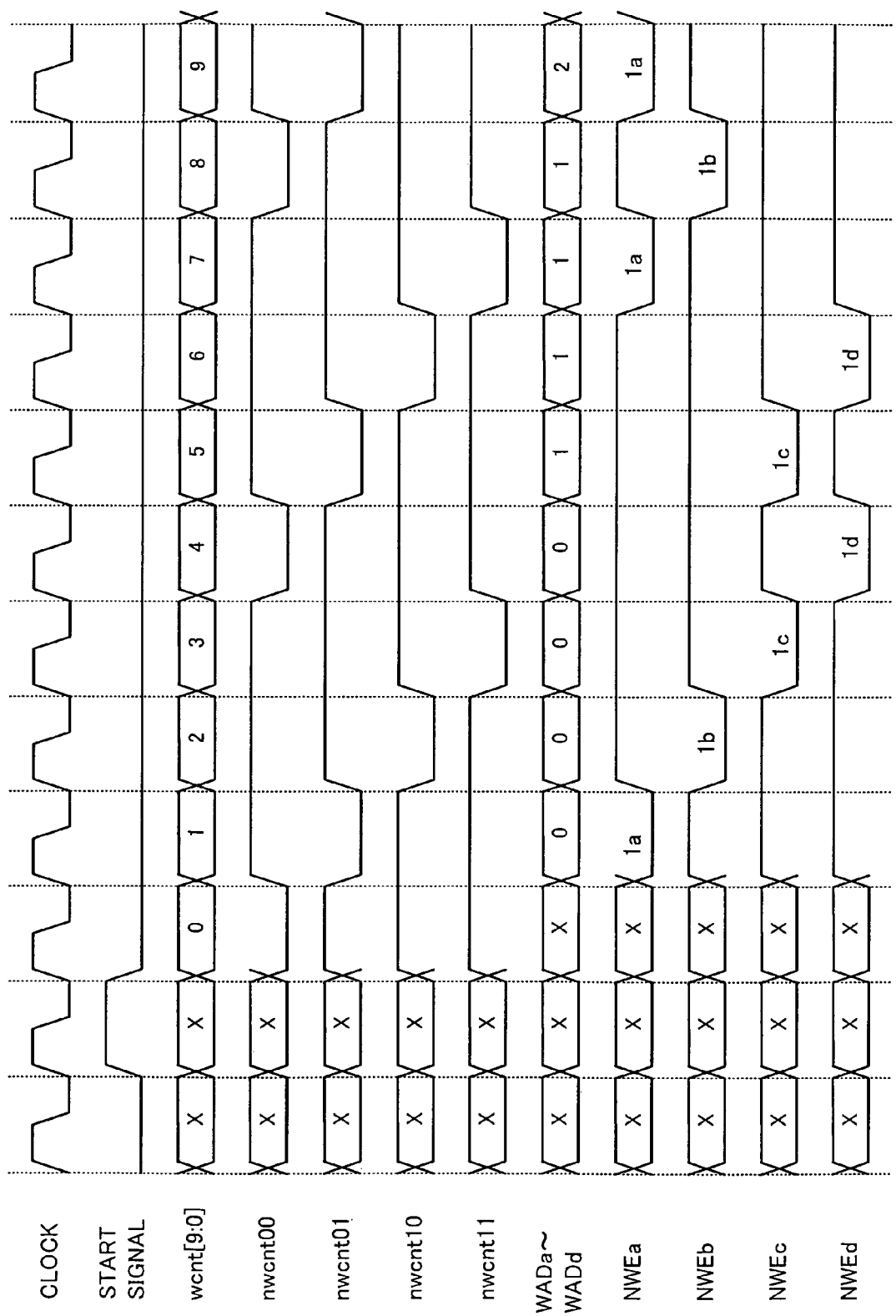
FIG. 5 is a timing chart showing memory write operation.

FIG. 5 is a timing chart showing memory write operation. In the example shown in FIG. 5, the number of bits of texture data is 16 (bit/pixel) and the width is 8 (pixel). As shown in FIG. 5, the period during which the write addresses WADa through WADd are "0", the V coordinate of texture data to be written is an even number and the write enables NWEa through NWEd are asserted in the order of NWEa→NWEb→NWEc→NWEd. Accordingly, write operation in the first through fourth texture memories 1a through 1d is performed in the order of the first texture memory 1a→the second texture memory 1b→the third texture memory 1c→the fourth texture memory 1d. On the other hand, the period during which the write addresses WADa through WADd are "1", the V coordinate of texture data to be written is an odd number and the write enables NWEa through NWEd are asserted in the order of NWEc→NWEd→NWEa→NWEb. Accordingly, write operation in the first through fourth texture memories 1a through 1d is performed in the order of the third texture memory 1c→the fourth texture memory 1d→the first texture memory 1a→the second texture memory 1b.

In this manner, one or a plurality of texture data which can be transferred at a time are written in one of the first through fourth texture memories 1a through 1d by single write operation, so that texture data can be written in memories at high speed in successive cycles.

Now, a configuration and operation of the memory read section 3 will be described specifically.

Figure 6:
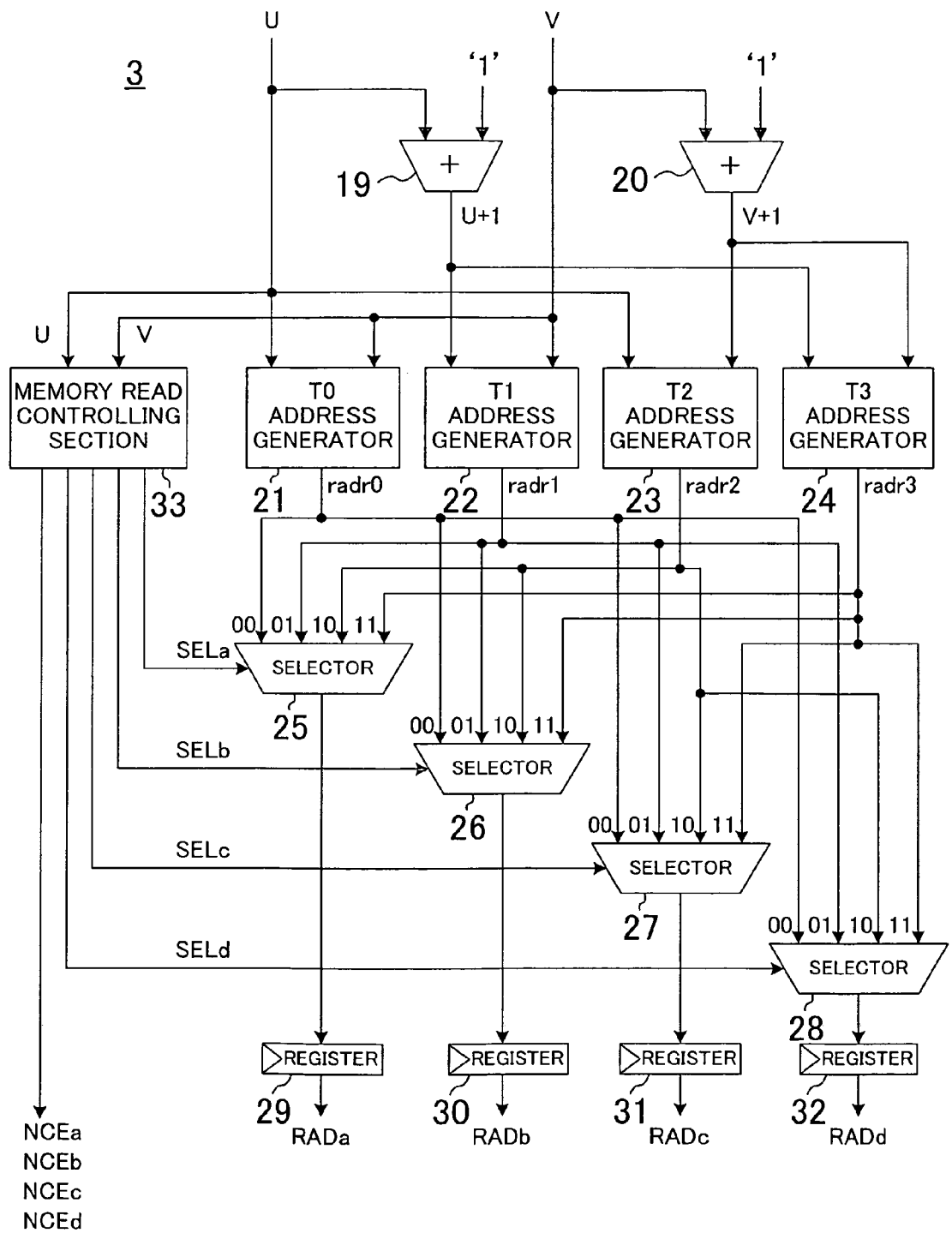
FIG. 6 is a diagram showing an internal configuration of a memory read section shown in FIG. 1.

FIG. 6 is a diagram showing an internal configuration of the memory read section 3 shown in FIG. 1. In FIG. 6, adders 19 and 20 add "1" to supplied U and V coordinates, respectively. A T0 address generator 21 generates and outputs a memory address radr0 of texture data corresponding to the coordinates (U, V). Likewise, a T1 address generator 22 generates and outputs a memory address radr1 of texture data corresponding to coordinates (U+1, V). A T2 address generator 23 generates and outputs a memory address radr2 of texture data corresponding to coordinates (U, V+1). A T3 address generator 24 generates and outputs a memory address radr3 of texture data corresponding to coordinates (U+1, V+1). Each of the memory addresses radr0 through radr3 is composed of eight bits.

FIG. 7 shows memory addresses generated by the T0 address generator 21. In FIG. 7, for example, {V [5:0], U [4:3]} represents the value of eight bits obtained by concatenating successive six bits from the fifth bit to the 0th bit of the coordinate value V and successive two bits from the fourth bit to the third bit of the coordinate value U. The T1 address generator 22, the T2 address generator 23 and the T3 address generator 24 also generate memory addresses in the same manner.

A selector 25 selects one of the memory addresses radr0 through radr3 in accordance with a 2-bit select signal SELa. Likewise, each of selectors 26, 27 and 28 selects one of the memory addresses radr0 through radr3 in accordance with a 2-bit select signal SELb, SELc or SELd, respectively. The selectors 25 through 28 select radr0 when the select signals SELa through SELd are "00" (binary number), select radr1 when the signals are "01" (binary number), select radr2 when the signals are "10" (binary number) and select radr3 when the signals are "11" (binary number). Registers 29 through 32 store addresses selected by the selectors 25 through 28, respectively, and output the stored addresses as readout addresses RADa through RADd, respectively.

A memory read controlling section 33 generates the select signals SELa through SELd based on the coordinates (U, V) and also generates the chip enables NCEa through NCEd to the texture memories 1a through 1d. FIG. 8 shows the select signals SELa through SELd generated by the memory read controlling section 33. In FIG. 8, V [0], U [2:0], SELa through SELd are represented by binary numbers. In FIG. 8, the hatched portions correspond to memories which do not need to be accessed in reading data. These portions are represented as "00" (binary number) in FIG. 8, but may be represented by any value.

In reading data, it is preferable to disable a chip enable to a texture memory which does not need to be accessed. FIG. 9 shows the chip enables NCEa through NCEd generated by the memory read controlling section 33. In FIG. 9, the hatched portions are under the same conditions as those in FIG. 8. In this case, these portions indicate that it is unnecessary to access a memory and thus a chip enable thereto is set at "1" to be disabled. This stops memory operation and reduces power consumption. Instead of or in addition to disabling a chip enable, input of a clock to a texture memory which does not need to be accessed may be stopped.

The texture selector 5 selects the texture data T0 through T3 at four points necessary for bilinear filtering calculation from the data D0a through D0d read out from the texture memories 1a through 1d, in accordance with relationships as shown in FIG. 10. In a case where the number of bits of texture data is 16 (bit/pixel), 16 bits out of the 32-bit data D0a through D0d are selected, but the texture data T0 through T3 is output in such a manner that the number of bits for each value of R, G and B is increased so as to allow bilinear filtering calculation by the bilinear filtering calculating section 6.

FIGS. 11A and 11B show concepts of write and read operation of texture data in this embodiment. FIG. 11A is for a case where the number of bits is 16. FIG. 11B is for a case where the number of bits is 32. In FIGS. 11A and 11B, symbols a through d denote that texture data is written in the first through fourth texture memories 1a through 1d, respectively. As shown in FIG. 11A, in the case where the texture data is composed of 16 bits, texture data is written in each of the texture memories 1a through 1d in two units which can be transferred at a time. That is, the texture data is transferred at high speed. As indicated by the broken-line rectangles A, B and C, four necessary texture data are read out from a plurality of texture memories in the same cycles. In the case of the rectangle A, for example, data only needs to be read out from the first and third texture memories 1a and 1c and access to the second and fourth texture memories 1b and 1d is unnecessary. Accordingly, as described above, the chip enables NCEb and NCEd are disabled.

As described above, in this embodiment, to transfer texture data to texture memories, writing is always performed in successive cycles, so that the texture data is transferred at high speed. In addition, texture data at four points necessary for bilinear filtering is read out in the same cycles, so that the filtering is performed at high speed. In reading data, by disabling a chip enable and stopping clock input to a texture memory which does not need to be accessed, power consumption of the processor is reduced.

In this embodiment, 32 bits of data can be written in each address in a texture memory, 32 bits of data can be transferred at a time, and two types of texture data, i.e., 16 bits of texture data and 32 bits of texture data, are used. However, the present invention is not limited to this embodiment and various changes may be made without departing form the spirit and the scope of the present invention. For example, in a processor configured such that 64 bits of data can be transferred at a time, if texture data is composed of 16 bits, four texture data may be transferred and two of the data may be concurrently written in, for example, the first and second texture memories at each time, and if texture data is composed of 32 bits, two texture data may be transferred and written in the first and second texture memories, respectively, at the same time. That is, texture data in a number capable of being transferred at a time and written in one address are written in a texture memory in common, resulting in that data is written at a speed obtained by taking advantage of the transfer ability of the data bus.

Embodiment 2

Figure 12:
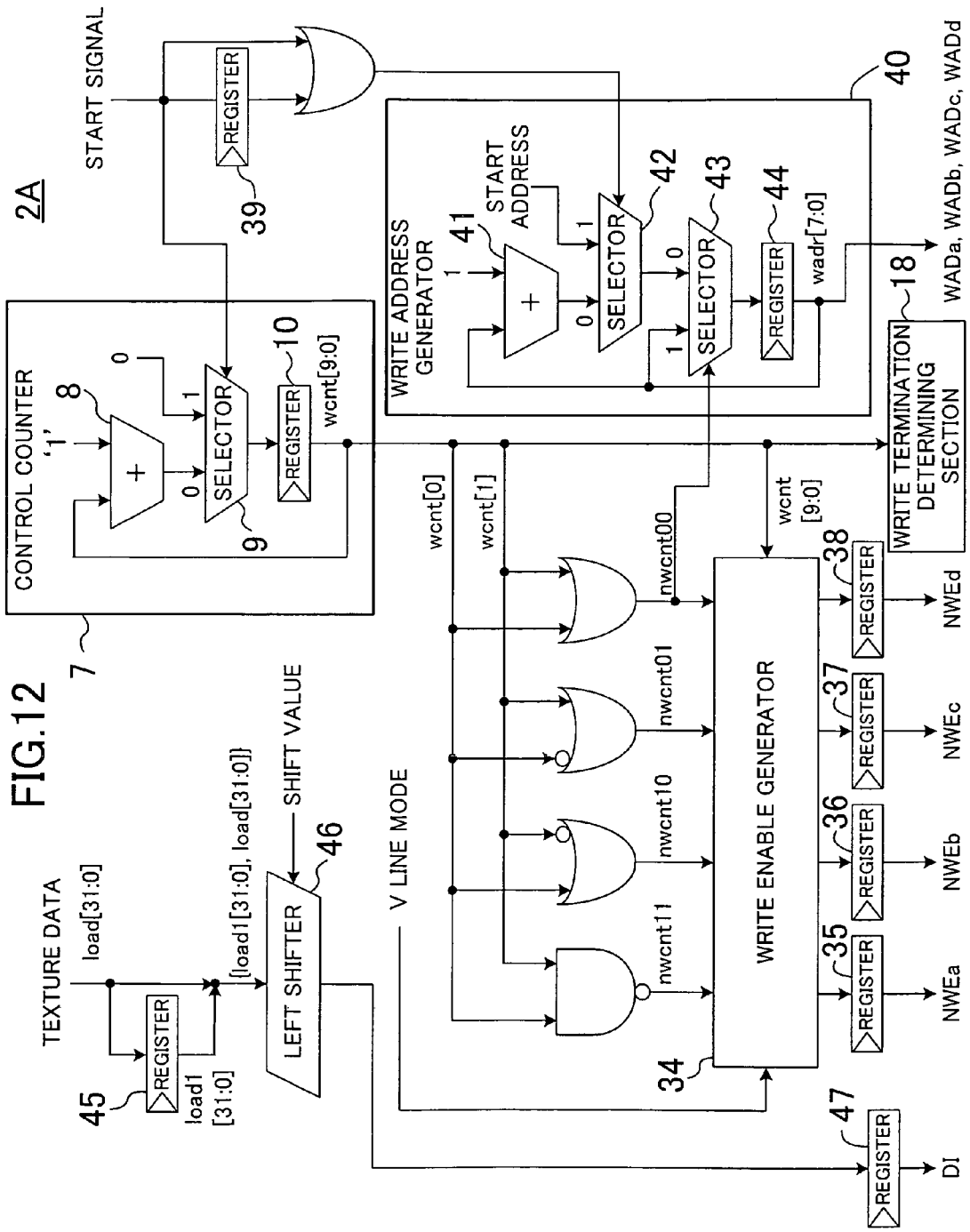
FIG. 12 is a block diagram showing a configuration of a memory write section according to a second embodiment of the present invention.

A configuration of a texture processor according to a second embodiment of the present invention is basically the same as that shown in FIG. 1, but is different from that of the first embodiment in the configuration of a memory write section 2A. FIG. 12 is a block diagram showing the configuration of the memory write section 2A of the second embodiment. In FIG. 12, components already described in the first embodiment with reference to FIG. 2 are denoted by the same reference numerals and detailed description thereof will be herein omitted.

A write enable generator 34 receives a V line mode VM in addition to a write count value wcnt and data nwcnt00, nwcnt01, nwcnt10 and nwcnt11. The write enable generator 34 selects one of the data nwcnt00, nwcnt01, nwcnt10 and nwcnt11 as a write enable NWEa, NWEb, NWEc or NWEd, respectively, based on the number of bits and the width of texture data, the write count value wcnt [9:0] and the V line mode VM.

The V line mode VM is a signal indicating whether the head V coordinate of supplied texture data is an even number or an odd number. The head V coordinate is an even number if the V line mode VM is "0" and is an odd number if the V line mode VM is "1".

If the V line mode VM is "0", i.e., the V coordinates of texture data to be written start with an even number, the same requirements as those shown in FIG. 3 for the first embodiment are used to determine whether the V coordinate of texture data is an even number or an odd number. On the other hand, if the V line mode VM is "1", i.e., the V coordinates of texture data to be written start with an odd number, the requirements for determining whether the V coordinate of texture data is an even number or an odd number are shown in FIG. 13. Then, as shown in FIG. 4, the write enables NWEa through NWEd are switched depending on whether the V coordinate is an even number or an odd number, in the same manner as in the first embodiment.

A register 39 is a flip-flop for applying a one-cycle delay to a start signal. A write address generator 40 generates write addresses WADa through WADd and is constituted by an adder 41, selectors 42 and 43 and a register 44. The adder 41 adds "1" to the value of the register 44. The selector 42 selects a result of the adder 41 when a signal of the logical sum of the start signal and the value of the register 39 is "0", and selects a start address when the signal is "1". This start address is settable from the outside of the texture processor. The selector 43 selects the output of the selector 42 when the data nwcnt00 is "0", and selects the value of the register 44 when the data is "1". The register 44 is an 8-bit flip-flop for storing the output of the selector 43.

The value of the register 44, i.e., wadr [7:0], is common to the write addresses WADa through WADd. The data nwcnt00 is "0" once in four cycles, so that the value of the register 44 is updated once in the four cycles. That is, each of the write addresses WADa through WADd is incremented by "1" every fourth time of memory writing.

A register 45 is a 32-bit flip-flop and holds texture data load [31:0] as load1 [31:0]. A left shifter 46 shifts, to the left, 64 bits of data obtained by concatenating the data load1 [31:0] held in the register 45 and the supplied texture data load [31:0], in accordance with a specified shift value. This shift value can be supplied from the outside of the texture processor. A register 47 is a 32-bit flip-flop and stores 32 most-significant bits of the output of the left shifter 46. The value of the register 47 serves as write data DI.

In this embodiment, it is determined whether the V coordinate of texture data is an even number or an odd number in accordance with the V line mode VM. Accordingly, regardless of whether the head V coordinate of the supplied texture data is an even number or an odd number, data writing is performed as in the first embodiment. In addition, the start address of data writing is settable, so that supplied texture data is written in an arbitrary address in a texture memory. For example, a lateral line of texture data to be transferred can be written in an arbitrary address of a texture memory each time. Accordingly, this embodiment enables operation in which an area corresponding to a rectangular region in large texture data in an external storage means is cut out and transferred to texture memories, for example, whereas the first embodiment has the constraint that texture data to be transferred is always stored in successive addresses in an external storage means.

In addition, it is possible to shift texture data which is being transferred. Accordingly, the start position of the texture data is not necessarily located on a word interface, so that the texture data is transferred more flexibly.

Embodiment 3

Figure 14:
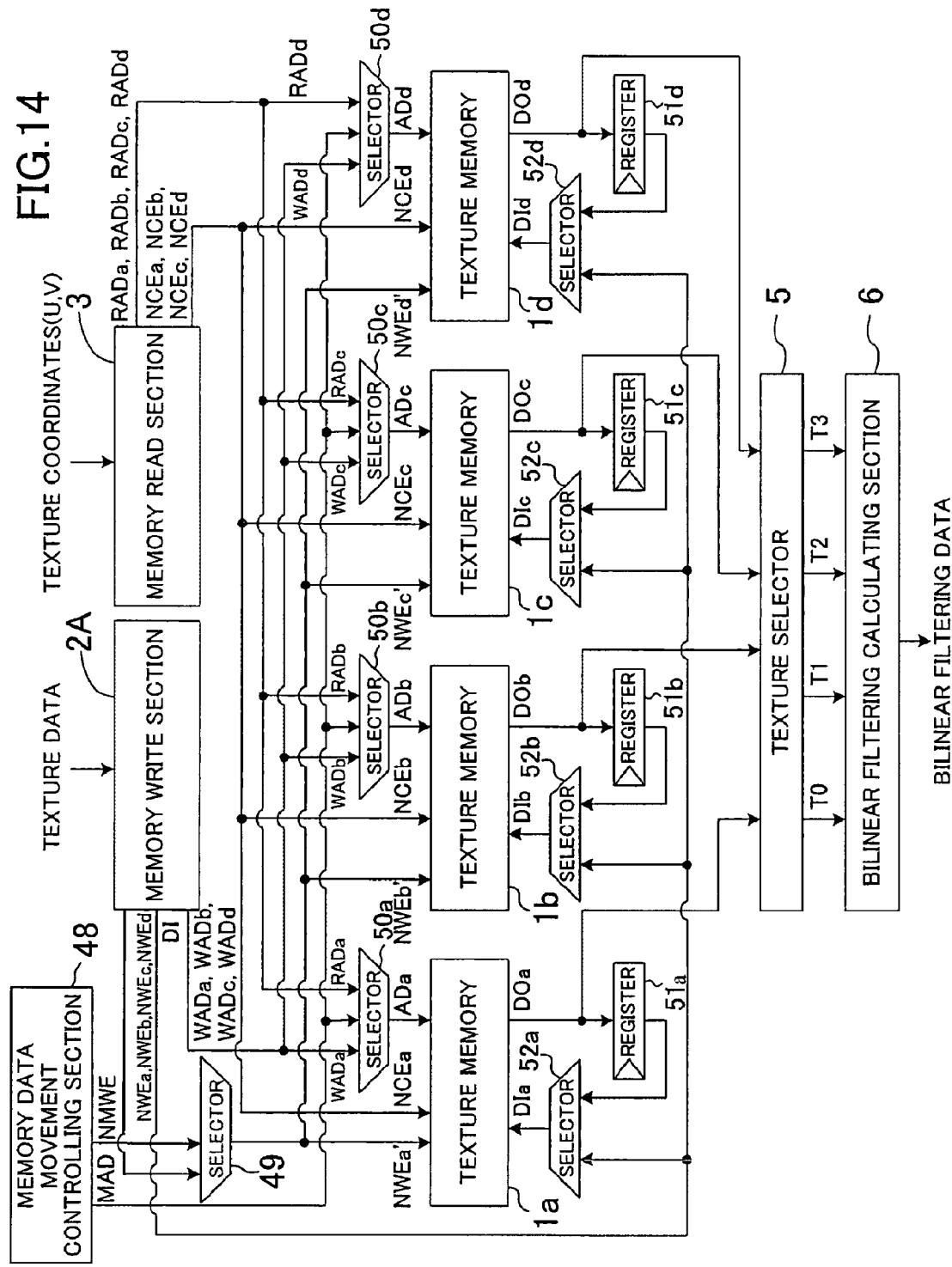
FIG. 14 is a block diagram showing a configuration of a texture processor according to a third embodiment of the present invention.

FIG. 14 is a block diagram showing a configuration of a texture processor according to a third embodiment of the present invention. In FIG. 14, components already shown in FIG. 1 are denoted by the same reference numerals and detailed description thereof will be herein omitted. Texture memories 1a through 1d, a memory read section 3, a texture selector 5 and a bilinear filtering calculating section 6 are the same as those described in the first embodiment, and a memory write section 2A is the same as that described in the second embodiment.

A memory data movement controlling section 48 has the function of moving texture data with the maximum V coordinate out of texture data sets stored in the first through fourth texture memories 1a through 1d during the preceding bilinear filtering, to an area in which texture data with the minimum V coordinate (which is zero in this case) out of texture data sets for use in the next bilinear filtering is stored in the first through fourth texture memories 1a through 1d.

Figure 15:
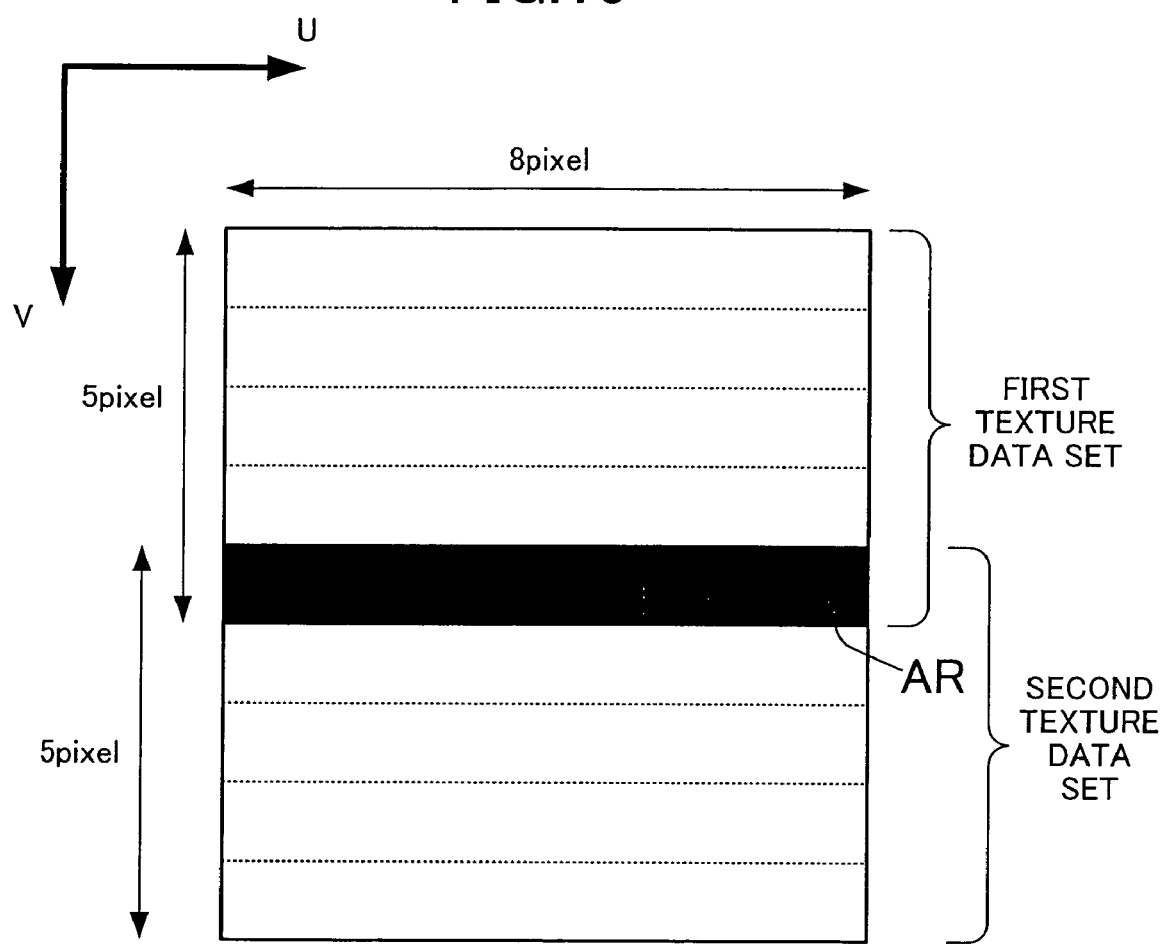
FIG. 15 shows a concept of an example of data division in dividing and transferring texture data.

FIG. 15 shows a concept of an example of data division in a case where bilinear filtering is performed by dividing texture data in an external storage means and transferring the divided texture data sets to internal texture memories. FIG. 15 shows a case where a texture is divided into regions each composed of 8 pixels×5 pixels as an example. In FIG. 15, a first texture data set and a second texture data set overlap each other in a region AR. Specifically, division of texture data for bilinear filtering is performed such that the texture data sets overlap each other in one line at their boundary. This is because bilinear filtering performed on the boundary between the texture data sets requires adjacent texture data parts of the respective texture data sets.

In view of this, in a case where the first texture memory set is stored in the texture memories 1a through 1d and subjected to bilinear filtering and then the second texture memory set is stored in the texture memories 1a through 1d, texture data in the overlapping region AR is generally written twice in the texture memories 1a through 1d.

On the other hand, in this embodiment, the memory data movement controlling section 48 is provided to prevent writing in the overlapping region AR from being performed twice, and thus the amount of texture data transferred from the external storage means is reduced. Specifically, after termination of bilinear filtering performed on the first texture memory set, the memory data movement controlling section 48 moves texture data in the overlapping region AR within each of the texture memories 1a through 1d in a memory data movement period.

The memory data movement controlling section 48 outputs an memory address MAD and a write enable NMWE for data movement and controls a selector 49, selectors 50a through 50d and selectors 52a through 52d.

The selector 49 selects the write enable NMWE during the data movement period and otherwise selects write enables NWEa through NWEd. The selector 49 outputs these selected write enables as write enables NWEa' through NWEd'.

The selectors 50a through 50d select write addresses WADa through WADd, respectively, during a period in which texture data is written in the texture memories 1a through 1d, select read addresses RADa through RADd, respectively, during a bilinear filtering calculation period, and select the address MAD during the data movement period. The selectors 50a through 50d output the selected addresses as memory addresses ADa through ADd, respectively.

Registers 51a through 51d are 32-bit flip-flops and store data DOa through DOd, respectively, which have been read out from the texture memories 1a through 1d. Selectors 52a through 52d select outputs from the respective registers 51a through 51d during the data movement period and otherwise select write data DI. The selectors 52a through 52d output the selected data as write data DIa through DId, respectively.

Figure 16:
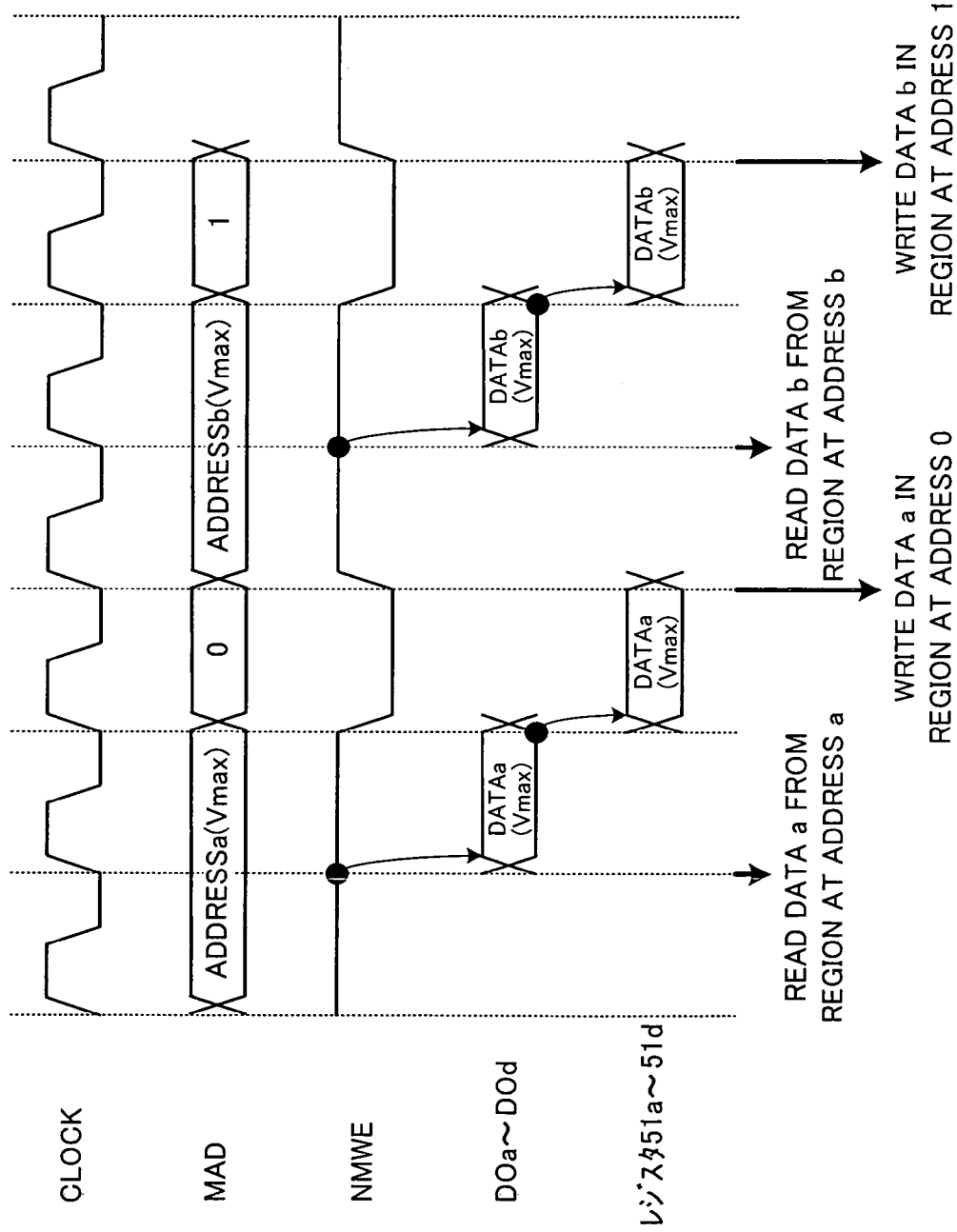
FIG. 16 is a timing chart showing an example of data movement in texture memories.

FIG. 16 is a timing chart showing an example of data movement in the texture memories 1a through 1d. The data movement is performed on the four texture memories 1a through 1d at the same time. FIG. 16 shows, as an example, a case where texture data having the maximum V coordinate, i.e., texture data in an overlapping region, is present in two addresses a and b.

As shown in FIG. 16, the memory data movement controlling section 48 outputs "address a" as the address MAD in two cycles. Concurrently, the memory data movement controlling section 48 also outputs the write enable NMWE in two cycles in a memory read state (NMWE="1") so that data in the address a is read out from the texture memories 1a through 1d and stored in the respective registers 51a through 51d.

In the next cycle, the memory data movement controlling section 48 outputs "0" as the address MAD in one cycle. Concurrently, the memory data movement controlling section 48 outputs the write enable NMWE in one cycle in a memory write state (NMWE="0") so that data stored in each of the registers 51a through 51d is written in a region corresponding to the address 0 in each of the texture memories 1a through 1d. Thereafter, data in "address b" is read out in the same manner and stored in a region corresponding to the address 1 in each of the texture memories 1a through 1d.

With the foregoing operation, texture data in an overlapping region of texture data sets is moved from a region where the V coordinate at the maximum to a region where the V coordinate is zero in each texture memory. In FIG. 16, the case where texture data having the maximum V coordinate is present in two addresses is shown as an example. Alternatively, texture data having the maximum V coordinate may be present in one address or in three or more addresses.

After texture data in the overlapping region has been moved in each of the texture memories 1a through 1d, the next texture data set is written in the texture memories 1a through 1d. At this time, it is sufficient to write texture data whose part in an overlapping region has been removed in the texture memories 1a through 1d from the address subsequent to the moved texture data.

As described above, in this embodiment, in performing bilinear filtering by dividing texture data in an external storage means and transferring the divided texture data sets to internal texture memories, texture data in an overlapping region is moved in each of the texture memories beforehand. Accordingly, the amount of the next texture data set to be transferred is reduced, resulting in high-speed transfer of texture data.

Embodiment 4

Figure 17:
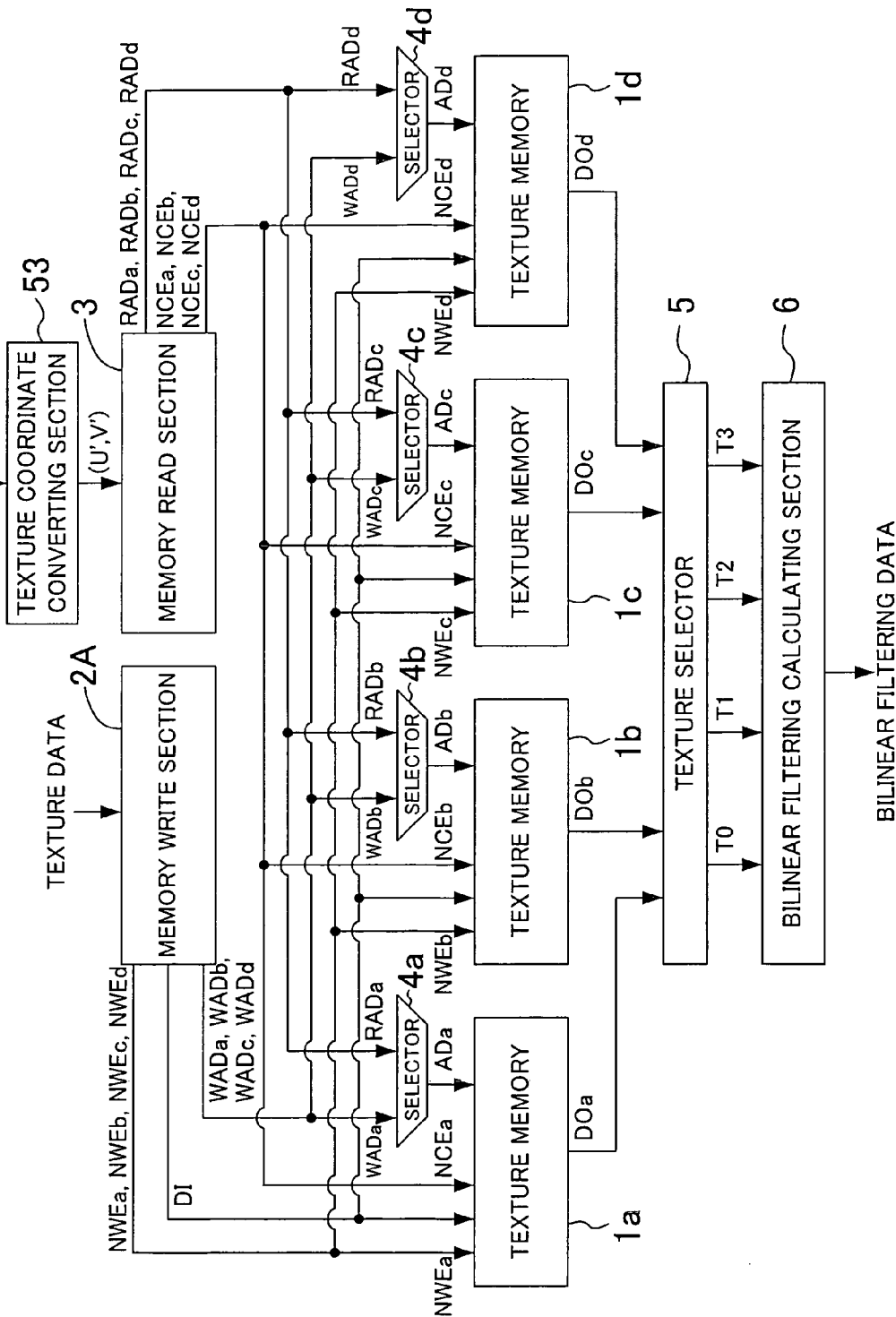
FIG. 17 is a block diagram showing a configuration of a texture processor according to a fourth embodiment of the present invention.

FIG. 17 is a block diagram showing a configuration of a texture processor according to a fourth embodiment of the present invention. In FIG. 17, components already shown in FIG. 1 are denoted by the same reference numerals and detailed description thereof will be herein omitted. Texture memories 1a through 1d, a memory read section 3, selectors 4a through 4d, a texture selector 5 and a bilinear filtering calculating section 6 are the same as those described in the first embodiment, and a memory write section 2A is the same as that described in the second embodiment.

In this embodiment, to perform bilinear filtering by dividing texture data in an external storage means and transferring the divided texture data sets to the texture memories 1a through 1d, the memory write section 2A sets a write-start address following an address for storing texture data with the maximum V coordinate out of texture data stored in the texture memories 1a through 1d, and then writes texture data obtained by removing texture data in an overlapping region from the next texture data set in the texture memories 1a through 1d.

In writing texture data in a texture memory in the order from the start address, if the write address exceeds the maximum address of texture memory, the write address is reset to zero and then the subsequent texture data is written in order. In this case, a register 44 in a write address generator 40 is an 8-bit flip-flop and has the minimum function for allowing generation of memory addresses. Therefore, when the write address exceeds the maximum address, the write address is automatically reset to zero.

In this case, an external controlling section as a CPU, which is not shown, operates in the following manner. The external controlling section holds a write address and sets the address subsequent to this write address as a write-start address. This allows the address of texture data with the maximum V coordinate to be recognized. In addition, the external controlling section transfers the next texture data set from the address subsequent to an overlapping region. Accordingly, texture data in the overlapping region is removed from the next texture data set.

FIGS. 18A through 18C show how divided texture data sets are stored in a texture memory in order. In FIGS. 18A through 18C, a case where 32-bit texture data is divided into texture data sets each composed of 128 pixels wide×8 pixels high is shown as an example, and memory regions in four texture memories 1a through 1d are shown in a united manner.

FIG. 18A shows a state in which a first texture data set is stored in a texture memory and Va is the V coordinate of the first texture data set. FIG. 18B shows a state in which a second texture data set is stored in the texture memory and Vb is the V coordinate of the second texture data set. A region where Va=7, serving as an overlapping region where the second texture data set overlaps the first texture data set, is used as a region where Vb=0 without change. Texture data with Vb=1 through 7 are stored in respective regions subsequent to the region where Vb=0. Since the region where Vb=0 is at the maximum memory address, the texture data with Vb=1 is stored in the region at the address 0 and the subsequent texture data are stored in respective regions at the following addresses in order.

FIG. 18C shows a state in which a third texture data set is stored and Vc is the V coordinate of the third texture data set. A region where Vb=7, serving as an overlapping region where the third texture data set overlaps the second texture data set, is used as a region where Vc=0 without change. Texture data with Vc=1 through 7 are stored in respective regions subsequent to the region where Vc=0. Since a region where Vc=1 is at the maximum memory address, texture data with Vc=2 is stored in the region at the address 0 and the subsequent texture data are stored in respective regions at the following addresses in order.

A texture coordinate converting section 53 converts texture coordinates (U, V) into (U', V') and outputs the converted coordinates so that the memory read section 3 correctly reads texture data stored in the manner as shown in FIGS. 18A through 18C. Specifically, the texture coordinate converting section 53 outputs the coordinate value U as a coordinate value U' without change. The coordinate value V is converted into a coordinate value V' in accordance with the position of a region where the V coordinate of texture data stored in the texture memories 1a through 1d is zero. This is because the memory read section 3 reads texture data based on the assumption that the region where the V coordinate is zero is present at the memory address 0. The position where the V coordinate is zero is stored in an external controlling section such as a CPU as described above. The position of the region where the V coordinate is zero is set in the texture coordinate converting section 53 from the outside.

The coordinate value V is converted into V' in the following manner:

If $V<VM$, $V'=V+VS$

If $V \geq VM$, $V'=V-VM$ where VS is the position of the region where the V coordinate of texture data stored in the texture memories 1a through 1d is zero, TH is a pixel length in the height direction of a texture data set and TM is TH−VS. In the case shown in FIG. 18C, VS=6, TH=8 and VM=TH−VS=8−6=2. If V=1, V<VM, and thus V'=V+VS=1+6=7. If V=4, V≧VM, and thus V'=V−VM=4−2=2. In this manner, the texture coordinate is converted so that texture data is correctly read out.

As described above, in this embodiment, in performing bilinear filtering by dividing texture data and transferring the divided texture data sets to texture memories, it is unnecessary to move texture data in an overlapping region beforehand in a texture memory as in the third embodiment. Accordingly, circuits for use in moving data are reduced and the process of moving data within a texture memory is omitted. As a result, texture data is transferred at higher speed.

According to the present invention, texture data is transferred to texture memories at high speed and bilinear filtering is performed at high speed. As a result, texture mapping is performed at higher speed in game machines and car navigation systems, for example.

What is claimed is:

1. A texture processor comprising:
   first, second, third and fourth texture memories for storing texture data;
   a memory write section for controlling writing of supplied texture data in the first through fourth texture memories;
   a memory read section for controlling reading of texture data at four points close to texture coordinates from the first through fourth texture memories; and
   a bilinear filtering calculating section for performing bilinear filtering calculation using the texture data at four points read out from the first through fourth texture memories by the memory read section,
   wherein in a single write operation, the memory write section writes texture data in a number capable of being transferred at a time and being written in one address, in one of the first through fourth texture memories, and
   if V coordinate of texture data to be written is an even number, the texture data is written in the first, second, third and fourth texture memories in this order whereas if the V coordinate is an odd number, the texture data is written in the third, fourth, first and second texture memories in this order,
   wherein the memory write section comprises:
   a control counter for generating a write count value; and
   a write enable generator for generating write enable for the first through fourth texture memories respectively, by determining whether the V coordinate of texture data to be written is an even number or an odd number based on a number of bits per pixel and a width of the texture data and the write count value generated by the control counter.

2. The texture processor of claim 1, wherein in reading data, the memory read section disables a chip enable with respect to at least one of the first through fourth texture memories to which access is unnecessary.

3. The texture processor of claim 1, wherein in reading data, the memory read section stops input of a clock to at least one of the first through fourth texture memories to which access is unnecessary.

4. The texture processor of claim 1, wherein the memory write section receives a V line mode indicating whether a head V coordinate of supplied texture data is an even number or an odd number, and determines if the V coordinate of the texture data is an even number or an odd number in accordance with the V line mode.

5. The texture processor of claim 4, wherein the memory write section is configured such that a start address for data writing is settable.

6. The texture processor of claim 4, wherein the memory write section shifts supplied texture data by a specified shift value and writes the shifted texture data in the first through fourth texture memories.

7. The texture processor of claim 1, further comprising:
   a memory data movement controlling section for moving texture data with maximum V coordinate of a first texture data set to a position where texture data with minimum V coordinate of a second texture data set is stored in the first through fourth texture memories, said memory data movement controlling section moving said texture data when the second texture data set is written in the first through fourth texture memories in which the first texture data set is stored, the second texture data set to be used next to the first texture data set.

8. The texture processor of claim 1, wherein the memory write section writes texture data except for texture data with minimum V coordinate of a second texture data set at a following position of texture data with maximum V coordinate of a first texture data set, said memory write section writes said texture data when the second texture data set is written in the first through fourth texture memories in which the first texture data set is stored, the second texture data set to be used next to the first texture data set, and
   the memory read section reads the texture data of the second texture data set with reference to a position where the texture data with the maximum V coordinate of the first texture data set is stored.

9. The texture processor of claim 1, wherein two texture data are transferred if texture data is composed of 16 bits per pixel whereas one texture data is transferred if texture data is composed of 32 bits per pixel.

* * * * *